R. W. ELLIOTT & J. JORGENSON.
WEIGHING SCALE.
APPLICATION FILED FEB. 2, 1911.

1,013,479.

Patented Jan. 2, 1912.

2 SHEETS—SHEET 1.

Witnesses,
Charles Pickles
R. S. Berry

Inventors,
Ralph W. Elliott
John Jorgenson
By Geo. H. Strong
atty

R. W. ELLIOTT & J. JORGENSON.
WEIGHING SCALE.
APPLICATION FILED FEB. 2, 1911.

1,013,479.

Patented Jan. 2, 1912.
2 SHEETS—SHEET 2.

Witnesses,
Charles Pickles
R. A. Berry

Inventors,
Ralph W. Elliott,
John Jorgenson
By Geo. H. Strong.
Atty

UNITED STATES PATENT OFFICE.

RALPH W. ELLIOTT AND JOHN JORGENSON, OF FRUITVALE, CALIFORNIA.

WEIGHING-SCALE.

1,013,479.

Specification of Letters Patent.   Patented Jan. 2, 1912.

Application filed February 2, 1911. Serial No. 606,206.

*To all whom it may concern:*

Be it known that we, RALPH W. ELLIOTT and JOHN JORGENSON, both citizens of the United States, residing at Fruitvale, in the county of Alameda and State of California, have invented new and useful Improvements in Weighing-Scales, of which the following is a specification.

This invention relates to weighing and computing devices.

The object of this invention is to provide a scale comprising a movable indexed card, and a hydro-static actuating device connected thereto, whereby a salesman may readily discern the weight and value of an article being sold.

The invention consists of the parts and the combination and construction of parts as hereinafter more fully described and claimed, having reference to the accompanying drawings, in which—

Figure 1:
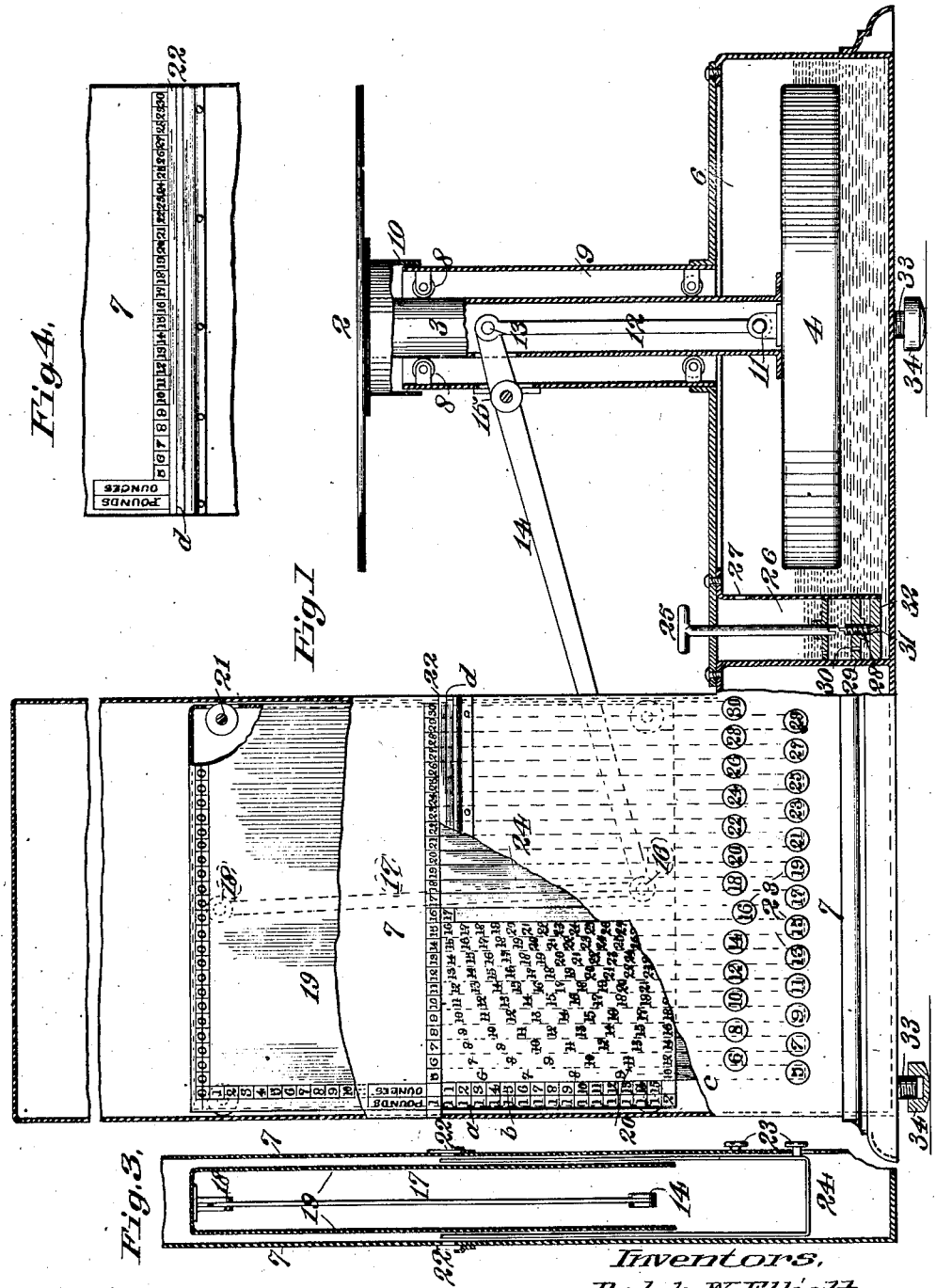
Figure 2:
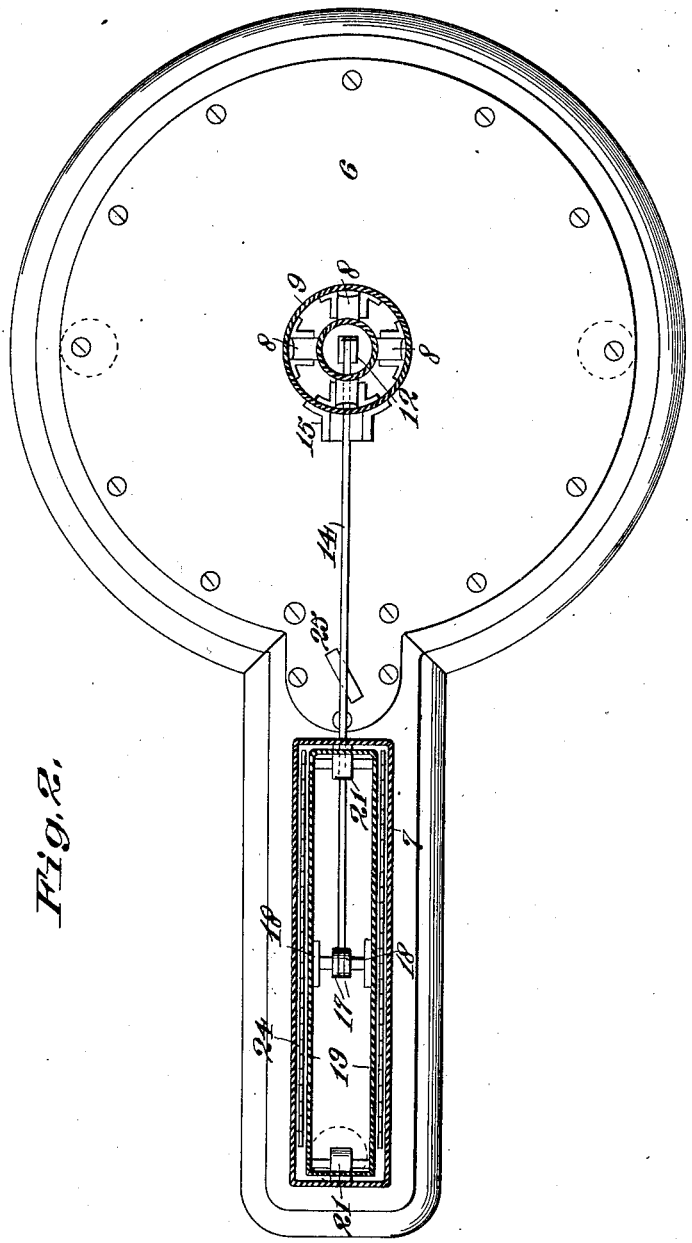

Figure 1 is a front elevation of the improved weighing device, partly broken away. Fig. 2 is a plan view of the same, partly in section. Fig. 3 is a vertical transverse section through the indicating mechanism. Fig. 4 is a detailed elevation of the casing.

In the illustrated form of our invention 2 represents a horizontally disposed weighing pan upon which may be placed articles to be weighed, and from the lower portion of the pan projects a tubular standard 3 having attached to its lower end a floatable structure 4, immersed in a fluid, indicated at 5. The fluid 5 is contained in a suitable receptacle 6, forming a portion of the frame or casing of the device, and which frame is projected upwardly as at 7, to inclose an indicating mechanism to be hereafter described. The standard 3 upon which is mounted the weighing pan 2 may be guided vertically by rollers or other equivalent devices 8 journaled upon a sleeve 9 projecting upwardly from the receptacle 6 and the upper open end of the sleeve 9 is covered by a depending flange 10 secured to the lower side of the weighing pan 2 to prevent the entrance of foreign material through the tubular sleeve 9 to the fluid 5 in the receptacle 6.

When an article, the weight and value of which is desired to be known, is placed upon the weighing pan 2, the floating member 4 will be further immersed in the fluid 5 until the resistance of the fluid counterbalances the weight of the superposed article on the scale pan 2. For the purpose of indicating to the salesman and to a purchaser, the weight and value of the article being weighed, there is connected to the float 4 at a pivot 11, a link 12 extending upwardly within the standard 3 which is connected at 13 to a lever 14, pivoted at 15 upon the sleeve 9. The lever 14 projects from one side of the sleeve 9, and is connected to its outer end at 16 by a link 17 which is pivoted at 18 to a suitably shaped and proportioned indicating device, here represented as a vertically disposed, rectangular frame 19, having indexed cards 20 upon its vertical faces. The scale bearing frame 19 is provided with suitable rollers 21 adapted to bear upon the interior surfaces of the upwardly projecting portion 7 of the scale case. and when the actuating member 4 is depressed by an article being placed upon the weighing pan 2, the lever 14 will rock about its pivot 15 and thus raise the scale cards 20 so that certain characters or figures in columns $a$ and $b$ representing pounds and ounces respectively, and in columns $c$, prices, will be moved so that the weight columns will indicate at reading glasses 22 fixed longitudinally across the front and back planes of the case section 7. Thus if an article weighing one pound and one ounce be placed upon the scale pan 2, this will cause a depression of the float member 4 in the fluid 5 until the weight is counterbalanced thereby, and the lever 14 will lift the scale frame 19 and its indexed cards 20 until the numerals 1—1 appear in the pound and ounce columns at the left-hand-end of the reading glasses, (Fig. 1). At the same time there will be moved to juxtaposition with some other portion of the reading glasses 22, one of the numerals in the price column $c$, which columns are divided into spaces which vary in the different columns in proportion to the value per pound of different articles. That is to say, the first column $c$ designates articles sold at a rate of 5¢. per pound; the second article sold at 6¢. per pound, and the remaining columns consecutively increasing up to 30¢. per pound in the last column, and when an article is placed upon the scale pan 2 weighing one pound, the scale cards 20 will be moved to carry the pound column #1 into registration with the reading glasses 22 at which time there will also appear behind the reading glasses the number 5, representing the price of one pound. Each column *c* is divided into as many equal spaces between the zero mark and each successive full pound mark, as the price value of the column may be equally subdivided therein. The first column *c* for instance, is divided into five divisions between the one pound mark and the two pound mark; the second column *c* is divided into six divisions between the one pound mark and the two pound mark, and so on in each column until the column representing 30¢. value is divided between the full pound marks, into thirty divisions, and each of the dividing lines in the respective price columns are marked with figures representing the total value of an article of given weight placed upon the scale pan 2.

In Fig. 1 the scale cards 20 have been lifted by the hydro-static device to disclose that the weight of an article placed upon the scale pan 2 is one pound, one ounce, and the value of the article is disclosed through the reading glasses 22 by the operator moving one of a plurality of actuating buttons 23, projecting through the face of the case section 7 and which are characterized by numbers corresponding to the value of different commodities per pound. These buttons 23 are each connected to respective U-shaped shutters 24, which are normally projected upwardly so that their ends cover all of that portion of the indexed cards 20, except the weight columns *a* and *b*. Having placed an article of a given price per pound upon the scale pan 2, the operator then moves downwardly that particular button 23 bearing the price rate upon its face, here indicated as the price button bearing the price mark of 16, thus lowering the upper ends of the U-shaped shutter and exposing through the reading glasses 22 upon the opposite sides of the casing section 7, the numeral 17, on each index card 20. Thus the purchaser and the salesman are instantly informed of the weight and the price of the article being weighed.

In the normal position of the scale, the indexed cards 20 are lowered to such a position that the zero line at the top of the card is moved down into registration with a sight line *d*, placed longitudinally along the center of the reading glasses 22, and if from any cause the fluid 5 contained in the base of the frame 6 loses a given level, the operator may pull upwardly a plunger 25 located in the case section 6 of the casing, which will move upwardly a quantity of fluid in a chamber 26 until the fluid flows through a small port 27 in one side of the chamber 26, over and into that portion of the casing 6 which contains the fluid 5. If by chance too large a quantity of fluid is allowed to flow through the port 27 until the zero line at the reading glasses 22 is carried out of alinement with the sight line *d*, then the operator may press the plunger 25 downwardly until its lower end will engage a screw 28 adjustable in the fixed diaphragm 29, which is provided with a port 30 and turn the screw open to a port 31 in a plate 32, the lower side of which is exposed to the fluid 5. When thus open, the valve member or screw 28 will allow a small quantity of the fluid 5 to escape into the chamber 26, thus lowering the level of the fluid 5 in the receptacle 6. By this means the level of the fluid 5 can be constantly maintained at a given point and the accuracy of the scales always controlled. It may be sometimes necessary by reason of the counter or table upon which the scale is mounted not being level, to adjust the level of the scale casing upon the table, and this is accomplished by means of suitable adjusting devices represented as screws 33, fixed to the lower portion of the casing and upon which screws are adjustable nuts 34, whereby the level of the casing may be readily obtained by screwing the nuts 34 up or down.

Having thus described our invention, what we claim and desire to secure by Letters Patent is—

1. A computing scale comprising a receiving pan, a float, a standard connecting said members, a suitably shaped casing, a fluid within said casing and supporting the float, means for adjusting the level of the fluid, and an indicating device comprising movable indexed cards and connections between said device and said float whereby the former is actuated when an article is placed upon the receiving member of the scale.

2. A computing scale comprising a receiving pan, a float, a standard connecting said members, a suitably shaped casing, a fluid within said casing and supporting the float, means for adjusting the level of the fluid, and an indicating device comprising movable indexed cards and connections between said device and said float whereby the former is actuated when an article is placed upon the receiving member of the scale, said indexed cards being divided into a plurality of vertical columns, some of which represent measures of weight and others indicating price values.

3. A computing scale comprising a receiving pan, a float, a standard connecting said members, a suitably shaped casing, a fluid within said casing and supporting the float, means for adjusting the level of the fluid, an indicating device comprising movable indexed cards and connections between said device and said float whereby the former is actuated when an article is placed upon the receiving member of the scale, said indexed cards being divided into a plurality of vertical columns, some of which represent measures of weight and others indicating price values, and reading glasses mounted in the casing through which portions of the indexed cards may be exposed.

4. A computing scale, comprising movable indexed cards having columns of characters, some of which represent measures of weight and others price values, a casing within which said cards are movable, reading glasses mounted in the sides of the casing through which the indexed cards may be exposed, a hydro-static device whereby said cards may be actuated when a weight is placed on said device, and a plurality of independent shutters covering the several price columns of the indicating cards, said shutters being adapted for movement to disclose a portion of one of the price columns.

In testimony whereof we have hereunto set our hands in the presence of two subscribing witnesses.

RALPH W. ELLIOTT.
JOHN JORGENSON.

Witnesses:
JOHN H. HERRING,
ZITA HASTINGS.